US009036183B2

(12) United States Patent
Kawase

(10) Patent No.: US 9,036,183 B2
(45) Date of Patent: May 19, 2015

(54) IMAGE FORMING APPARATUS WITH OPERATION DISPLAY UNIT

(75) Inventor: Junichi Kawase, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 588 days.

(21) Appl. No.: 12/929,182

(22) Filed: Jan. 6, 2011

(65) Prior Publication Data

US 2011/0176164 A1 Jul. 21, 2011

(30) Foreign Application Priority Data

Jan. 15, 2010 (JP) ................................ 2010-007167

(51) Int. Cl.
*G06F 3/12* (2006.01)
*G03G 15/00* (2006.01)

(52) U.S. Cl.
CPC .................................. *G03G 15/5016* (2013.01)

(58) Field of Classification Search
USPC ........................................................ 358/1.15
See application file for complete search history.

(56) References Cited

U.S. PATENT DOCUMENTS

| | | | |
|---|---|---|---|
| 4,944,031 | A | 7/1990 | Yoshino et al. |
| 6,314,254 | B1 | 11/2001 | Wakahara |
| 8,453,064 | B2 | 5/2013 | Machino et al. |
| 2009/0067892 | A1 | 3/2009 | Mikajiri et al. |

FOREIGN PATENT DOCUMENTS

| | | | | |
|---|---|---|---|---|
| JP | 05216344 | A | | 8/1993 |
| JP | 05257340 | A | | 10/1993 |
| JP | 10222014 | A | * | 8/1998 |
| JP | 2000071553 | A | | 3/2000 |
| JP | 2000-270133 | | | 9/2000 |
| JP | 2002-091104 | | | 3/2002 |
| JP | 2002-258559 | | | 9/2002 |
| JP | 2002258559 | A | * | 9/2002 |
| JP | 2002268390 | A | | 9/2002 |
| JP | 2003-143346 | | | 5/2003 |

(Continued)

OTHER PUBLICATIONS

English Translation of JP2009290432A provided by JPO.*

(Continued)

*Primary Examiner* — Martin Mushambo
(74) *Attorney, Agent, or Firm* — Harness, Dickey & Pierce, P.L.C.

(57) ABSTRACT

Provided is an image forming apparatus including an apparatus body, an operation display unit provided on top of the apparatus body and including an operation display surface that allows an input operation by a user and provides a display for the user, and a supporting member with one end thereof connected to the back of the operation display unit and the other end thereof connected to an upper surface of the apparatus body. The supporting member supports the operation display unit such that the operation display surface faces the front of the apparatus body. Operation display unit connecting sections that connect to the one end of the supporting member are provided on the back of the operation display unit and apparatus body connecting sections that connect to the other end of the supporting member are provided on the upper surface of the apparatus body.

4 Claims, 8 Drawing Sheets

(56) References Cited

FOREIGN PATENT DOCUMENTS

| | | | | |
|---|---|---|---|---|
| JP | 3741691 | A | | 1/2004 |
| JP | 2004061898 | A | | 2/2004 |
| JP | 2009-204639 | | | 9/2009 |
| JP | 2009-206983 | | | 9/2009 |
| JP | 2009-290432 | | | 12/2009 |
| JP | 2009290432 | A | * | 12/2009 |
| WO | WO 2006000127 | A1 | * | 1/2006 |

OTHER PUBLICATIONS

English translation of JP2002258559.*
English translation of JPH10222014.*
European Search Report dated Aug. 30, 2011 issued in corresponding European Application No. 11250018.6.
Abstract of Japanese Patent Publication No. JP2004-004559, published Jan. 8, 2004.
Japanese Office Action mailed Oct. 22, 2013.

* cited by examiner

IMAGE FORMING APPARATUS WITH OPERATION DISPLAY UNIT

CROSS-REFERENCE TO RELATED APPLICATIONS

The present application claims priority to and incorporates by reference the entire contents of Japanese Patent Application No. 2010-007167 filed in Japan on Jan. 15, 2010.

BACKGROUND OF THE INVENTION

1. Field of the Invention

The present invention relates to an image forming apparatus including an operation display unit that allows an input operation by a user and provides a display for the user.

2. Description of the Related Art

Conventionally, in image forming apparatuses of this type, ways to provide an operation display unit at a plurality of locations depending on conditions of the use of the image forming apparatus are proposed. In particular, for the operation display unit used in a relatively fast and multifunctional image forming apparatus, a large LCD module or the like is provided and supported on an upper surface of an apparatus body in a manner protruded on the upper surface of the apparatus body is known to improve the operability and visibility of the operation display unit (for example, see Japanese Patent Application Laid-open No. 2000-071553).

When the operation display unit is, protruded on the upper surface of the apparatus body, the operation display unit located at a position even higher than the upper surface of the apparatus body may deteriorate the operability and visibility depending on a working position or a posture of the user (particularly in a seated posture in a wheelchair or the like).

With this structure, the connecting position of the supporting member to the apparatus body can be selected from a number of apparatus body connecting sections and the connecting position of the supporting member to the operation display unit can be selected from a number of operation display unit connecting sections. This allows the location of the operation display unit to be moved, whereby the operability and visibility of the operation display unit may be improved.

Consequently, an image forming apparatus with an operation display unit of superior operability and visibility can be provided.

Furthermore, addition of new members or replacement of any existing members and such are not required, resulting in no cost increase.

SUMMARY OF THE INVENTION

It is an object of the present invention to at least partially solve the problems in the conventional technology.

According to an aspect of the present invention, an image forming apparatus includes an apparatus body; an operation display unit provided on top of the apparatus body and including an operation display surface that allows an input operation by a user and provides a display for the user; and a supporting member with a first end thereof connected to reverse side of the operation display unit and a second end thereof connected to an upper surface of the apparatus body, the supporting member supporting the operation display unit such that the operation display surface faces in a same direction as a front surface of the apparatus body does, and a plurality of operation display unit connecting sections that connects to the first end of the supporting member is provided on the reverse side of the operation display unit and a plurality of apparatus body connecting sections that connects to the second end of the supporting member is provided on the upper surface of the apparatus body.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the invention will be described below with reference to the accompanying drawings.

The structure of an image forming apparatus will be explained.

First Embodiment

Figure 1:
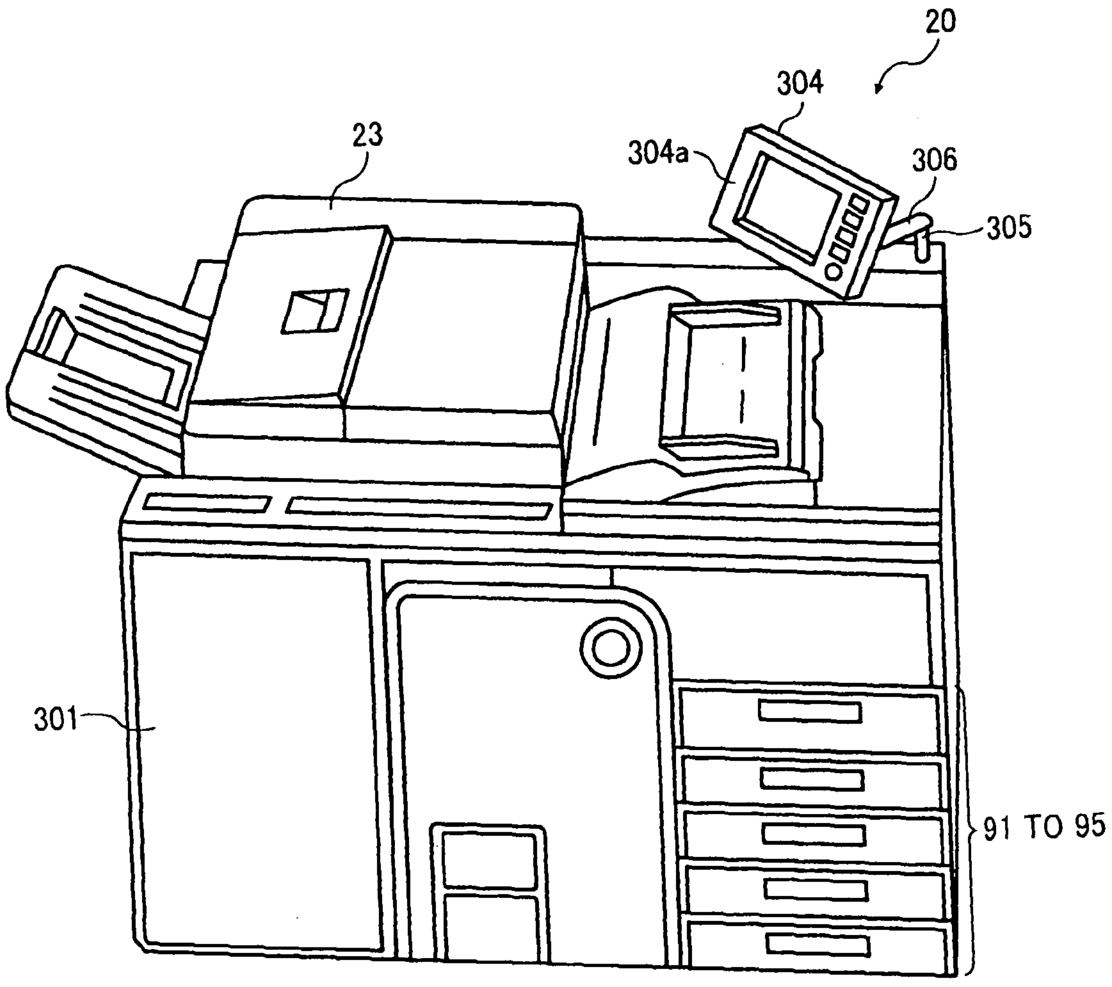
FIG. 1 is a perspective view illustrating external appearance of an image forming apparatus according to a first embodiment of the invention.
Figure 2:
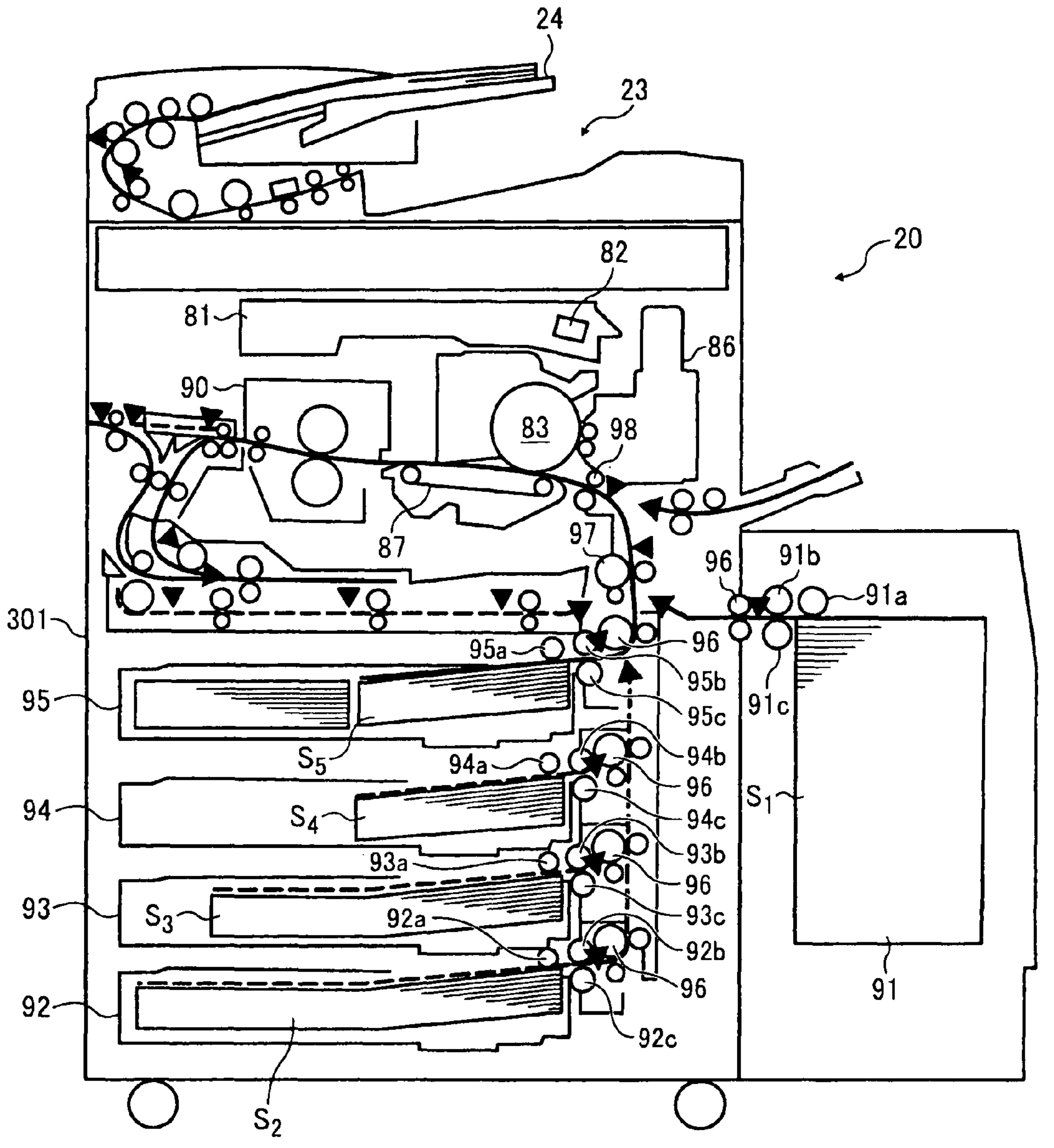
FIG. 2 is a diagram schematically illustrating the structure of the image forming apparatus according to the first embodiment.
Figure 3:
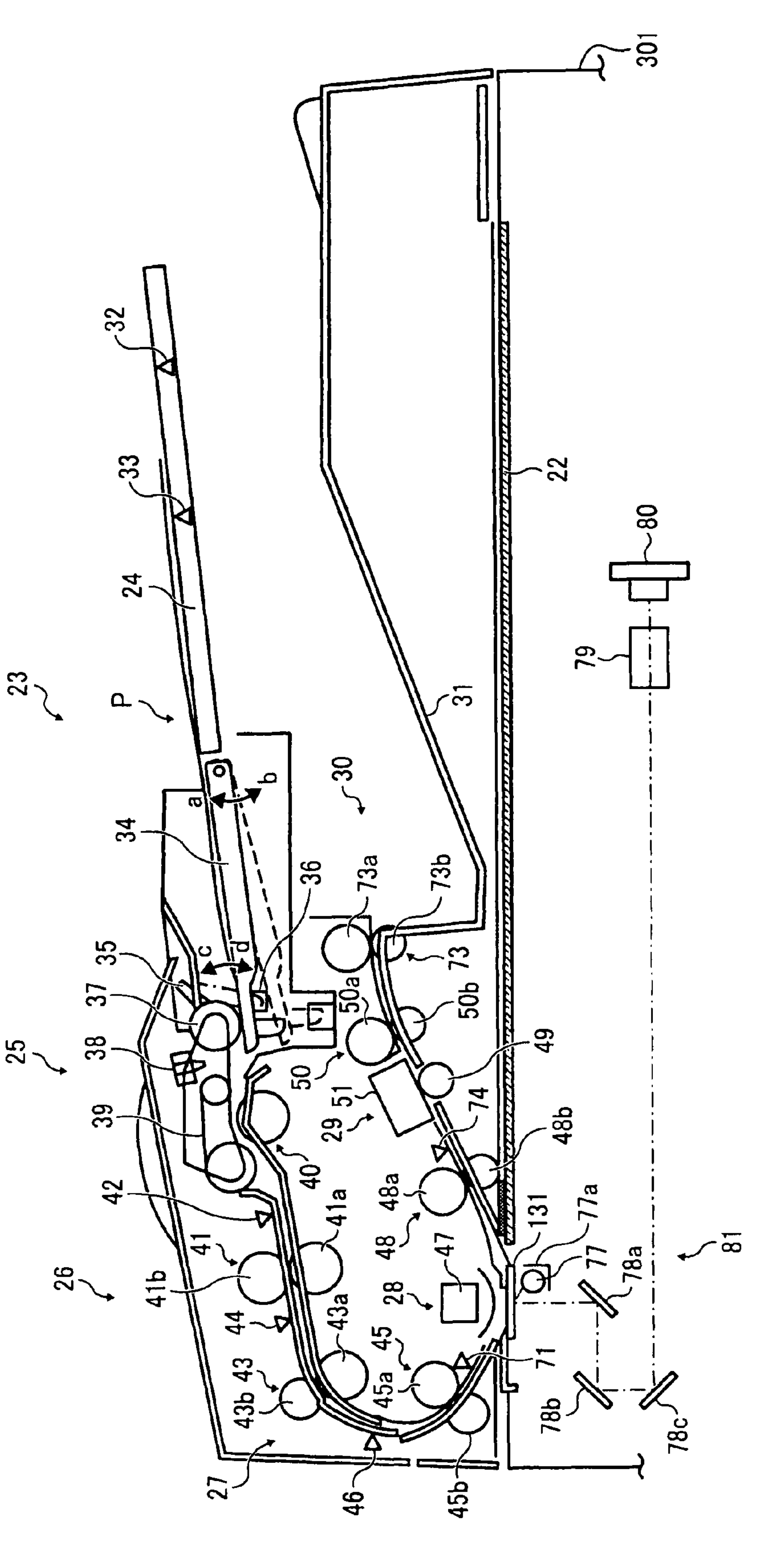
FIG. 3 is a diagram schematically illustrating the structure of an ADF of the image forming apparatus according to the first embodiment.

As illustrated in FIGS. 1 to 3, a contact glass 22 is provided on an upper surface of an apparatus body 301 of a copying machine 20 that is an image forming apparatus, and a slit glass 131 of an area smaller than the contact glass 22 is provided on the upper surface of the apparatus body 301 adjacent to the contact glass 22. The slit glass 131 is sometimes referred to as a sheet through DF contact glass or simply referred to as a contact glass.

On top of the apparatus body 301, an ADF 23 as an automatic document feeder is provided, and the ADF 23 is adapted to open and close with respect to the contact glass 22 via a hinge mechanism not depicted. The contact glass 22 is for scanning an original in a state being placed and stopped on the contact glass 22. By contrast, the slit glass 131 is for scanning an original being conveyed by the ADF 23.

The ADF 23 includes: an original table 24 where an original bundle P of stacked originals is placed with its original surface facing up; a paper separating-feeding unit 25 that separates and feeds the originals one sheet at a time from the original bundle P placed on the original table 24; a registration unit 26 that butt-aligns the fed original to correct skew and that pulls and conveys the original thus aligned; a turning unit 27 that turns and coveys the original to be conveyed with its original surface facing towards the slit glass 131; a first scan conveying unit 28 where an image on the original surface is scanned by a scanning unit 81 provided below the contact glass 22; a second scan conveying unit 29 that scans an image on the back surface of the scanned original; a discharging unit 30 that discharges the original, after the both surfaces of which are scanned, to outside the ADF 23; and a stacking unit 31 that stacks and holds the scanned originals.

Figure 4:
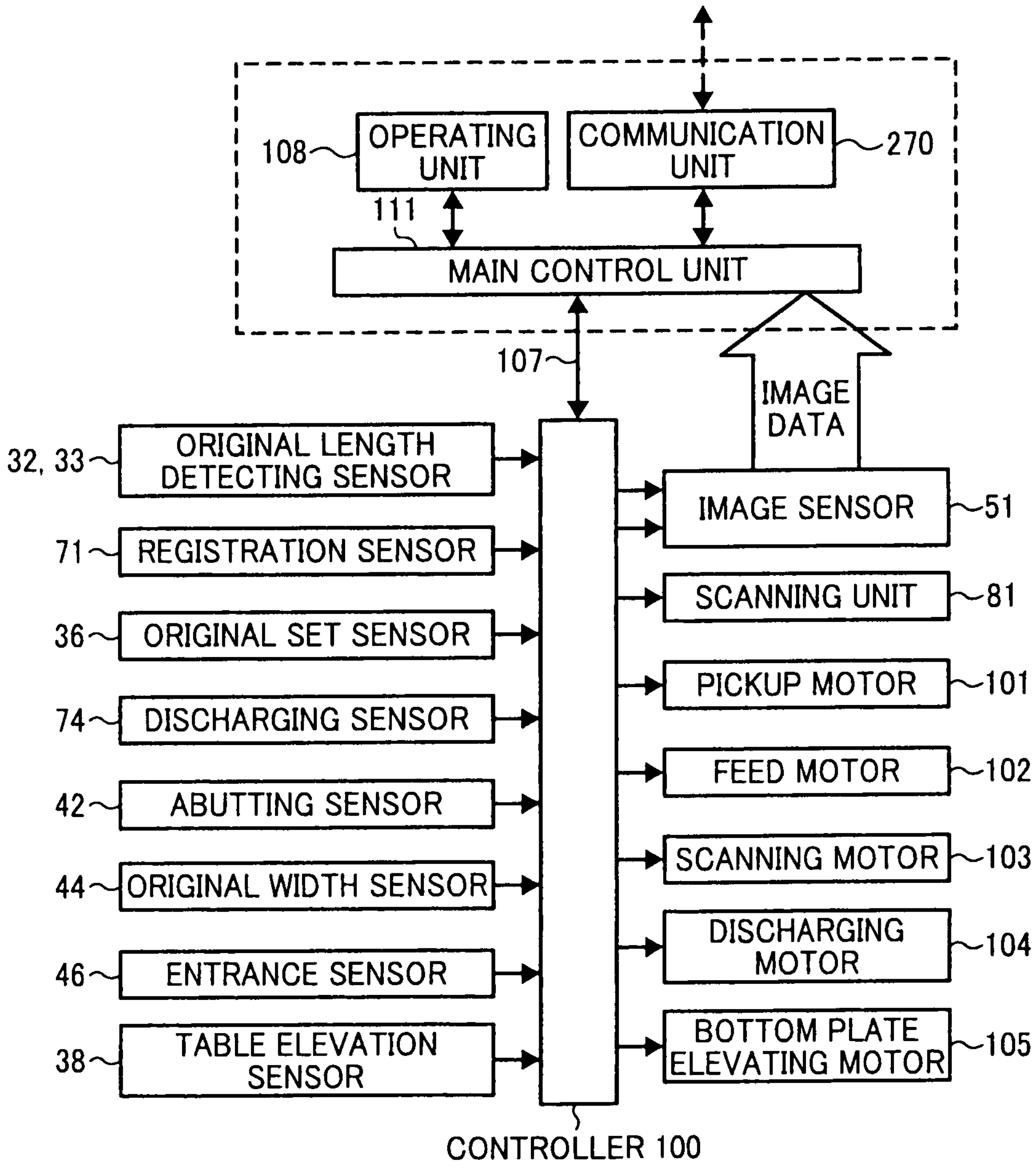
FIG. 4 is a block diagram of the image forming apparatus according to the first embodiment.

The ADF 23, as depicted in FIG. 4, also includes: a pickup motor 101 that performs various driving including conveying operation; a feed motor 102; a scanning motor 103; a discharging motor 104; a bottom plate elevating motor 105; and a controller 100 that controls a series of operations of the ADF 23.

On a table surface of the original table 24, original length detecting sensors 32 and 33 that detect the length of the original are provided. Each of the original length detecting sensors 32 and 33 is structured with a sensor such as a reflective type sensor; or an actuator type sensor that can perform detection of even a single sheet of original, to detect the length of the original in a conveying direction and output a detecting signal to the controller 100. Accordingly, the original length detecting sensors 32 and 33 are disposed on the table surface of the original table 24 so as to determine at least whether it is lengthwise direction or widthwise direction of the original.

At an edge (downstream side in the conveying direction of the original) of the original table 24, a movable table 34 is provided. The movable table 34 moves up and down, as indicated by the arrow a-b, by the bottom plate elevating motor 105.

On the original table 24, side guides not depicted are provided. The side guides perform positioning of the original bundle P in widthwise direction (in a direction orthogonal to the conveying direction of the original).

In the vicinity, of the movable table 34, a set filler 35 and an original set sensor 36 are provided. The set filler 35 moves to the position indicated by solid lines from the position indicated by broken lines when the original bundle P is placed on the original table 24. The original set sensor 36 outputs a signal to the controller 100 when the original set sensor 36 detects the shift of the set filler 35 from a detected state to a non-detected state. When the signal is output from the controller 100 to a main control unit 111 of the apparatus body 301 via an I/F 107, the apparatus body 301 switches over to a standby state for scanning the original.

When the controller 100 determines that the original bundle P is placed on the original table 24 based on the detecting signal from the original set sensor 36, the controller 100 raises the movable table 34 by driving the bottom plate elevating motor 105 so as to make the top most surface of the original bundle P contact a pickup roller 37.

The pickup roller 37 receives a driving force transmitted from the pickup motor 101 via a not depicted cam mechanism. The pickup roller 37 is moved up and down as indicated by the arrow c-d between a position contacting the top surface of the original bundle P and a retracting position by the pickup motor 101 and the cam mechanism.

Above the movable table 34, a table elevation sensor 38 is provided. The table elevation sensor 38, when the pickup roller 37 is raised as the movable table 34 is raised in the arrow "a" direction, detects an upper limit of elevation by detecting the position of the pickup roller 37.

When a print key in an operating unit 108 provided on the apparatus body 301 is pressed and an original feed signal is sent to the controller 100 from the main control unit 111 via the I/F 107, the pickup roller 37 is rotary driven by normal rotation of the feed motor 102 and feeds a few sheets (ideally a single sheet) of originals on the original table 24.

The original thus fed is conveyed to a paper separating-feeding unit 25 that includes a paper feeding belt 39 and a reverse roller 40 provided in the downstream of the pickup roller 37.

The paper feeding belt 39 is rotary driven in a feeding direction (clockwise direction) by the normal rotation of the feed motor 102. The reverse roller 40 is rotary driven in a direction opposite to the feeding direction (clockwise direction) by the action of a built-in torque limiter not depicted when the feed motor 102 normally rotates. Consequently, even when the pickup roller 37 picks up a plurality of sheets of originals, the top most original and lower originals are separated and only the top most original is fed.

More specifically, the reverse roller 40 is in contact with the paper feeding belt 39 at a predetermined pressure. When the reverse roller 40 is contacting the paper feeding belt 39 directly or with a single sheet of an original interposed therebetween, the reverse roller 40 is driven in the counter-clockwise direction following the rotation of the paper feeding belt 39. When two or more sheets of originals happen to enter between the paper feeding belt 39 and the reverse roller 40, because of a driven torque to follow being lower than a set torque of the torque limiter, the reverse roller 40 rotates in the clockwise direction that is the primary rotating direction to push back the extra sheets of originals, thereby preventing double-feed. The original separated as a single sheet by the action of the paper feeding belt 39 and the reverse roller 40 is conveyed by the paper feeding belt 39.

At the downstream of the paper feeding belt 39, abutting rollers 41 are provided. The abutting rollers 41 are includes a driving roller 41*a* and a driven roller 41*b* and are rotary driven by the feed motor 102.

The abutting rollers 41 correct skew of the original separated as a single sheet by the action of the paper feeding belt 39 and the reverse roller 40 and conveys the skew-corrected original further downstream.

More specifically, while the original is being fed, because of the feed motor 102 being stopped, the abutting rollers 41 are also in a stopped state. The leading edge of the separated original is detected by an abutting sensor 42 provided upstream of the abutting rollers 41 and then hits on the abutting rollers 41.

When the abutting sensor 42 detects the leading edge of the original and outputs a signal to the controller 100, the controller 100 drives the feed motor 102 to revolve the paper feeding belt 39 for a predetermined distance from the detection of the abutting sensor 42 so that the original is pressed on the abutting rollers 41 with deflection of a predetermined amount.

The controller 100 also drives the pickup motor 101 to rotate, before the feed motor 102 is stopped, to retract the pickup roller 37 from the upper surface of the original bundle P. In this case, because the original is conveyed by the power to go forward from the paper feeding belt 39 alone, the leading edge of the original enters a nip of the driving roller 41*a* and the driven roller 41*b* of the abutting rollers 41, and therefore, the skew of the original is corrected.

The controller 100 drives the feed motor 102 in reverse direction after the skew is corrected. Then, the abutting rollers 41 are. rotary driven by the feed motor 102 and the separated original is conveyed to intermediate rollers 43. The intermediate rollers 43 include a driving roller 43*a* and a driven roller 43*b,* and are driven by the feed motor 102.

When the feed motor 102 is driven in reverse, the driving force of the feed motor 102 is transmitted to the abutting rollers 41 and the intermediate rollers 43, while not transmitted to the pickup roller 37 and the paper feeding belt 39.

At the downstream of the abutting rollers 41, original width sensors 44 are provided. The original width sensors 44 are provided in plurality from the near side to the far side in FIG. 3 to detect the original conveyed and to output signals to the controller 100. The controller 100 detects the size of the original in the width direction (direction orthogonal to the conveying direction of the original) based on the signals received from the original width sensors 44.

The controller 100 detects the length of the original in the conveying direction based on the detecting signal received from the abutting sensor 42. More specifically, the controller 100 detects the length of the original by counting pulse signals of the feed motor 102 between when the abutting sensor 42 is turned ON by detecting the leading edge of the original and when the abutting sensor 42 is then turned OFF by detecting the trailing edge of the original.

At the downstream of the intermediate rollers 43, scanning entrance rollers 45 are provided. The scanning entrance rollers 45 include a driving roller 45*a* and a driven roller 45*b,* and are driven by the scanning motor 103.

Over the slit glass 131, a white background plate 47 is provided with its cross-section formed in a U-shape to guide the original to be conveyed.

At the downstream of the background plate 47, scanning exit rollers 48 are provided. The scanning exit rollers 48 include a driving roller 48*a* and a driven roller 48*b.*

At the downstream of the scanning exit rollers 48, a second scanning roller 49 is provided. The second scanning roller 49 includes a driving roller. At the downstream of the second scanning roller 49, scanning exit rollers 50 are provided. The scanning exit rollers 50 include a driving roller 50*a* and a driven roller 50*b.* The scanning entrance rollers 45, the scanning exit rollers 48, the second scanning roller 49, and the scanning exit rollers 50 are driven by the scanning motor 103.

Above the second scanning roller 49, an image sensor 51 such as a CCD or a CIS is provided. The image sensor 51 scans the other surface of the original.

At the downstream of the intermediate rollers 43, an entrance sensor 46 is provided. The entrance sensor 46 outputs a signal to the controller 100 when the leading edge of the original is detected.

Upon receiving the signal from the entrance sensor 46, the controller 100 starts to decelerate the feed motor 102 to equalize an original conveying speed with a scan conveying speed before the leading edge of the original enters a nip of the driving roller 45*a* and the driven roller 45*b* of the scanning entrance rollers 45. At the same time, the controller 100 drives the scanning motor 103 to normally rotate so as to connect the intermediate rollers 43 to the driving system of the scanning motor 103 as well as driving the scanning entrance rollers 45, the scanning exit rollers 48, and the second scanning roller 49.

When conveying the original from the registration unit 26 to the turning unit 27 by driving the abutting rollers 41 and the intermediate rollers 43; setting the conveying speed of the original in the registration unit 26 faster than that in the first scan conveying unit 28 shortens a processing time to feed the original to the slit glass 131; and also shortens the distance between the originals.

At the downstream of the scanning entrance rollers 45, a registration sensor 71 is provided. The registration sensor 71 detects the leading edge of the original and outputs a signal to the controller 100.

Upon receiving the signal from the registration sensor 71, the controller 100 decelerates the feed motor 102 over a predetermined conveying distance of the paper feeding belt 39, temporarily stops the original before the slit glass 131, and then sends a registration stop signal to the main control unit 111 via the I/F 107. Upon receiving a scan start signal from the main control unit 111, the controller 100 accelerates the scanning motor 103 to increase the conveying speed up to a predetermined conveying speed before the leading edge of the original, which has been in registration stop, reaches the slit glass 131; and the controller 100 causes the intermediate rollers 43 and the scanning entrance rollers 45 convey the original.

When the controller 100 receives the scan start signal before the leading edge of the original reaches the registration sensor 71, it turns into a registration non-stop scanning operation. In the registration non-stop scanning operation, the registration stop is not performed and the scanning is performed while the scan conveying speed is maintained.

At the timing of the leading edge of the original reaching the slit glass 131 calculated by counting pulses of the scanning motor 103, a gate signal indicating an effective image area of the original surface in a sub-scanning direction is output to the main control unit 111. The gate signal is output continuously until the trailing edge of the original passes through the slit glass 131.

When a single-sided original is scanned, the original that has passed through the slit glass 131 is conveyed to the discharging unit 30 through the second scan conveying unit 29. In this case, when a discharging sensor 74 detects the leading edge of the original, discharging rollers 73 are rotated in the counter-clockwise direction by the normal rotation of the discharging motor 104.

The controller 100 counts pulses of the discharging motor 104 when the leading edge of the original is detected by the discharging sensor 74 so as to decelerate the driving speed of the discharging motor 104 just before the trailing edge of the original passes a nip of a driving roller 73*a* and a driven roller 73*b* of the discharging rollers 73, thereby preventing the discharged original from jumping out of the stacking unit 31.

On the other hand, when a double-sided original is scanned, the controller 100 counts the pulses of the scanning motor 103 after the leading edge of the original is detected by the discharging sensor 74. Then, at the timing of the leading edge of the original reaches the image sensor 51 calculated by counting the pulses of the scanning motor 103, a gate signal indicating the effective image area of the original surface in the sub-scanning direction is output from the main control unit 111, via the controller 100, to the image sensor 51. The gate signal is output continuously until the trailing edge of the original passes through the image sensor 51.

The second scanning roller 49 is colored in white. The reason for being colored in white is that the second scanning roller 49 is used as a reference white for obtaining shading data at the image sensor 51. The second scanning roller 49 is provided underneath the image sensor 51 for preventing the original from floating when the original is scanned by the image sensor 51.

The apparatus body 301 of the copying machine 20 includes, as depicted in FIG. 3, the scanning unit 81 including: a cylindrical light source 77 including a xenon lamp, a halogen lamp or the like; reflecting mirrors 78*a* to 78*c;* a condenser lens 79; and an image sensor 80 such as a CCD. Image information scanned by the scanning unit 81 is radiated to a photosensitive element 83 by a writing unit 82. The light source 77 includes a reflector 77*a* for a better luminance distribution over the original surface. The light source 77 is not limited to a xenon lamp or a halogen lamp, but also a fluorescent light may be used. An image reader of the invention includes: the scanning unit 81; and the slit glass 131.

Figure 5:
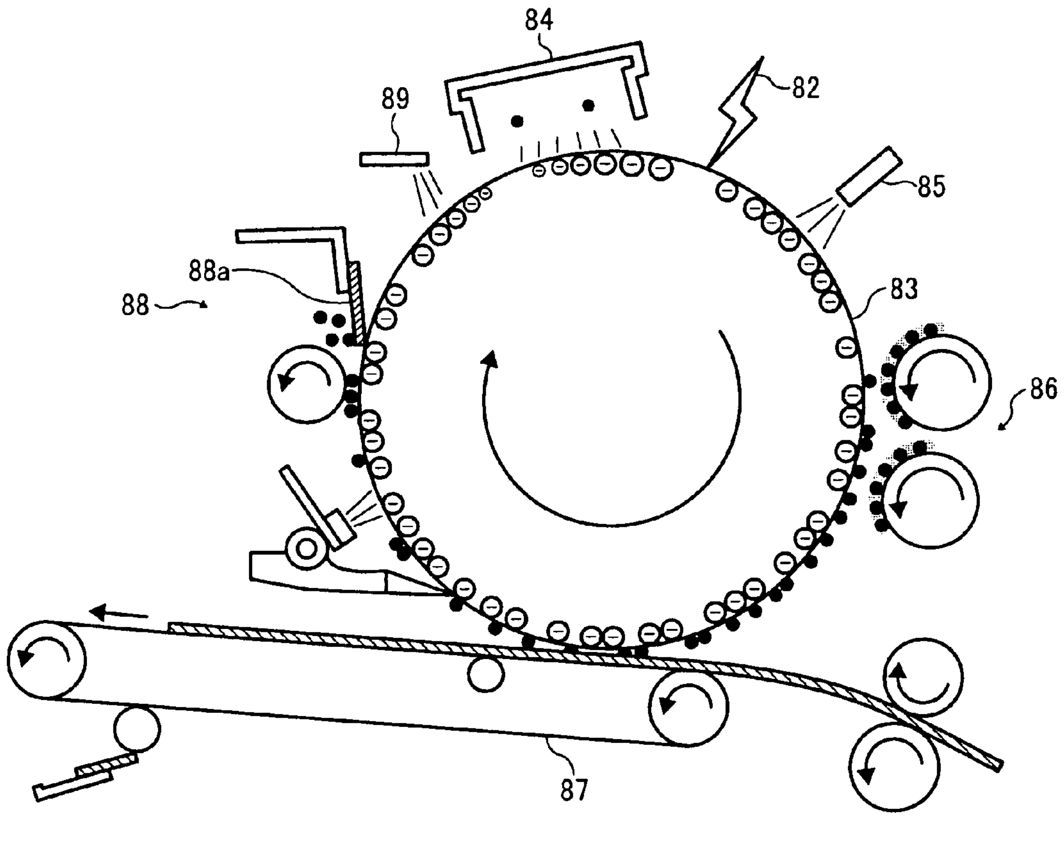
FIG. 5 is a diagram illustrating the structure of an image forming unit of the image forming apparatus according to the first embodiment.

As illustrated in FIG. 5, on the periphery of the photosensitive element 83, the following that constitute an image forming unit together with the photosensitive element 83 are provided: a charging unit 84; the writing unit 82 that includes a laser diode and the like; a voltage sensor 85; a developing unit 86; a transfer belt 87; a cleaning device 88; and a neutralization apparatus 89 structured with a light emitting diode (LED) and the like. The charging unit 84 controls a corona discharge of positive electric charges with a grid in the dark to charge the surface of the photosensitive element 83 to a constant electrical potential.

The writing unit 82 irradiates the surface of the photosensitive element 83, which is charged at the constant potential, with a laser beam containing the image information, thereby removing negative charges on the photosensitive element 83 to form a latent image. The voltage sensor 85 measures the electrical potential on the photosensitive element 83 to perform correction by process control. In other words, the copying machine 20 is configured as a laser beam printer.

The developing unit 86 causes negatively charged toner to adhere to the area on the photosensitive element 83 where the electrical charges are removed to form a visible image. The transfer belt 87 is applied with a positive bias to transfer the negatively charged visible image onto a recording sheet (recording medium) and conveys the recording sheet.

The cleaning device 88 includes a cleaning blade 88*a* that scrapes off residual toner on the photosensitive element 83. The neutralization apparatus 89 removes residual electrical charges of the photosensitive element 83 by lighting the LED in preparation of forming a new image on a subsequent recording sheet.

The recording sheet on which a toner image is formed by a series of these operations is conveyed to a fixing device 90. In the fixing device 90, the toner image is fixed onto the recording sheet by heat and pressure. Specifically, the copying machine 20 is configured as an electrophotographic copying machine.

As illustrated in FIG. 2, the apparatus body 301 includes storage cassettes 91 to 95 in which recording sheets $S_1$ to $S_5$ of different sizes are stored, respectively. The recording sheets stored in the storage cassettes 91 to 95 are fed by calling rollers 91*a* to 95*a,* and separated by paper feeding rollers 91*b* to 95*b* that rotate in the conveying direction and reverse rollers 91*c* to 95*c*. The reverse rollers 91*c* to 95*c* are in sliding contact with the paper feeding rollers 91*b* to 95*b* and rotate in a separation inhibiting direction. The recording sheet thus separated is conveyed to a pair of registration rollers 98 via pairs of relaying rollers 96 and 97, and then conveyed to a conveying path between the photosensitive element 83 and the transfer belt 87 timed by the registration rollers 98.

Accordingly, the copying machine 20 is configured as an electrophotographic copying machine and a laser, beam printer. With a communication unit 270 (see FIG. 4) provided therein for communicating with a public network and the like, the copying machine 20 is also configured as a facsimile apparatus.

A supporting structure of an operation display unit 304 provided on top of the apparatus body 301 will now be described.

As illustrated in FIG. 1, on top of the apparatus body 301, the operation display unit 304 is provided having an operation display surface 304*a* that allows an input operation by a user and provides a display for the user. The operation display unit 304 is supported on top of the apparatus body 301 by a support 305, a supporting arm 306, and the like. The operation display surface 304*a* includes keys for an input device, a liquid crystal panel for display, and the like.

Figure 6:
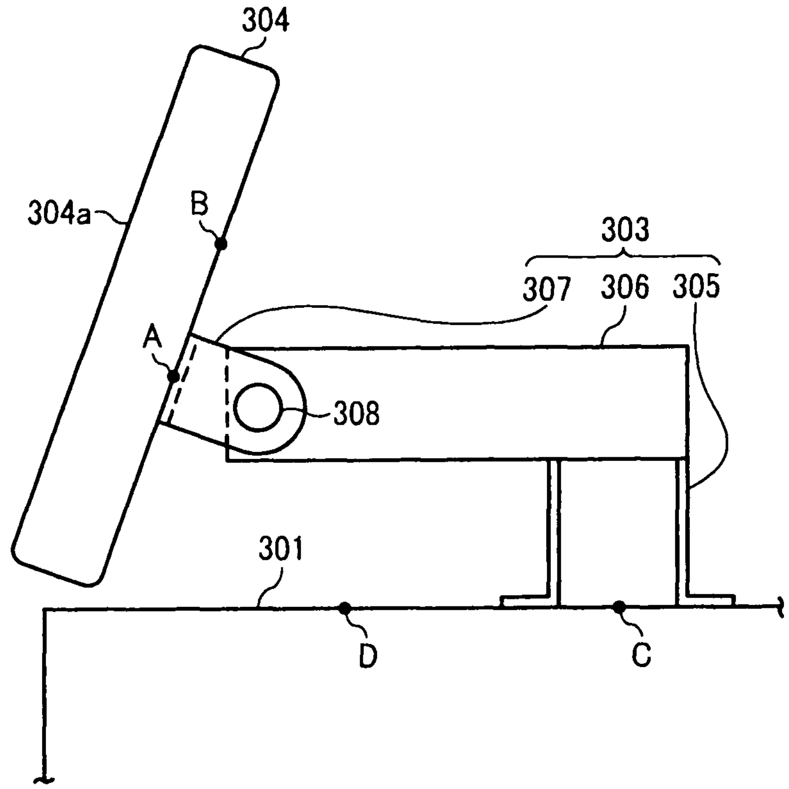
FIG. 6 is a side view of an example of the mounting position of the operation display unit of the image forming apparatus according to the first embodiment.
Figure 7:
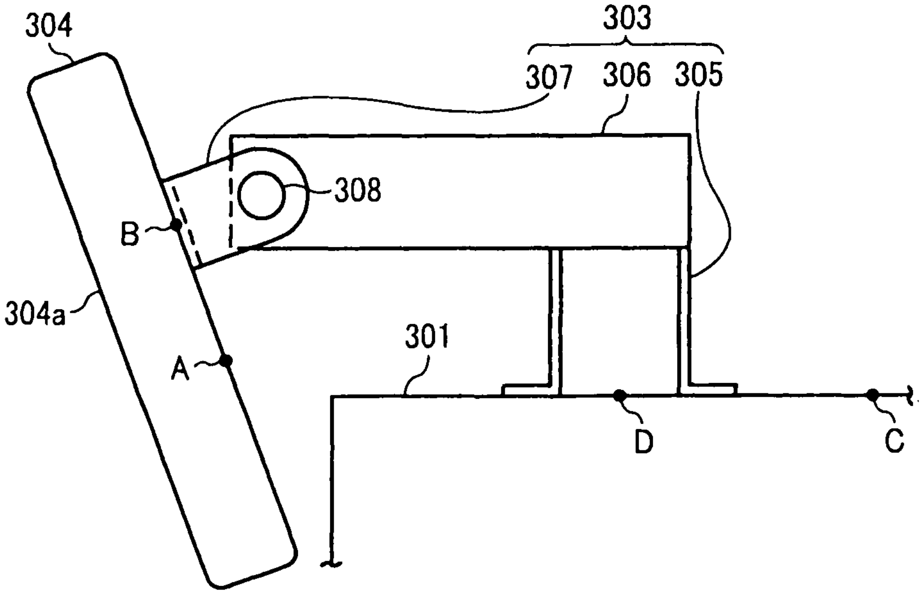
FIG. 7 is a side view of another example of the mounting position of the operation display unit of the image forming apparatus according to the first embodiment.

As illustrated in FIGS. 6 and 7, at an end of the supporting arm 306 on the operation display unit 304 side, a connecting member 307 is rotatably provided via a rotation fulcrum point 308 structured as a hinge. The connecting member 307 is connected to the back of the operation display unit 304. The rotation fulcrum point 308 is structured, for example, with a free stop hinge. This allows an angle of the operation display unit 304 in a vertical direction (rotation angle about a horizontal axis) with respect to the supporting arm 306 to be set optionally, thereby changing an elevation angle of the operation display unit 304.

A lower end portion of the support 305 can be connected and fixed to one of a plurality of (two in the present embodiment) apparatus body connecting sections C and D provided on the upper surface of the apparatus body 301 in a front-back direction. The lower end portion of the support 305 is fixed to the apparatus body connecting section C or the apparatus body connecting section D by screw fixation or the like. As depicted as a near side in FIG. 2 or in a left direction in FIG. 6, the front side where the user of the apparatus body 301 is expected to be located is defined as a forward direction of the apparatus body 301, and the opposite side (back side) is defined as a backward direction of the apparatus body 301. By selecting the connecting position of the support 305 to the apparatus body 301 from the apparatus body connecting section C and the apparatus body connecting section D, the mounting position of the operation display unit 304 is movable in the front-back direction. As illustrated in FIG. 6, when the support 305 is connected to the apparatus body connecting section C of the apparatus body 301, the operation display unit 304 is located backward. When the support 305 is connected to the apparatus body connecting section D of the apparatus body 301, as illustrated in FIG. 7, the operation display unit 304 is located forward.

The connecting member 307 can be connected and fixed to one of a plurality of (two in the present embodiment) operation-display-unit connecting sections A and B provided on the back of the operation display unit 304 in an up-down direction. The connecting member 307 is fixed to the operation display unit connecting section A or the operation display unit connecting section B by screw fixation or the like. An upward direction in FIGS. 2 and 6 is defined as an upward direction of the apparatus body 301, and the opposite side is defined as a downward direction of the apparatus body 301. The mounting position of the operation display unit 304 is movable in the up-down direction (vertical direction) by selecting the connecting position of the connecting member 307 to the operation display unit 304 from the operation display unit connecting section A and the operation display unit connecting section B. As illustrated in FIG. 6, when the connecting member 307 is connected to the operation display unit connecting section A of the operation display unit 304, the operation display unit 304 is located upward. When the connecting member 307 is connected to the operation display unit connecting section B of the operation display unit 304, as illustrated in FIG. 7, the operation display unit 304 is located downward.

The support 305, the supporting arm 306, and the connecting member 307 constitute a supporting member 303 supporting the operation display unit 304 such that the operation display surface 304*a* faces in a same direction as the front surface of the apparatus body 301 does. The end of the connecting member 307 connecting to the back of the operation display unit 304 corresponds to one end of the supporting member 303 of the present invention, and the lower end of the support 305 corresponds to the other end of the supporting member 303 of the present invention.

As illustrated in FIG. 6, when the support 305 is connected to the apparatus body connecting section C of the apparatus body 301, and the connecting member 307 is connected to the operation display unit connecting section A of the operation display unit 304, the operation display unit 304 is located in back and upward, and the rotation of the operation display unit 304 about the horizontal axis, i.e., the counter-clockwise rotation in FIG. 6, is regulated by the upper surface of the exterior of the apparatus body 301.

As illustrated in FIG. 7, when the support 305 is connected to the apparatus body connecting section D of the apparatus body 301, and the connecting member 307 is connected to the operation display unit connecting section B of the operation display unit 304, the operation display unit 304 is located in front and downward (low position), and the rotation of the operation display unit 304 about the horizontal axis is regulated by the front surface of the exterior of the apparatus body 301.

As a consequence, the connecting position of the support 305 to the apparatus body 301 can be selected from the apparatus body connecting section C and the apparatus body connecting section D, and the connecting position of the connecting member 307 to the operation display unit 304 can be selected from the operation display unit connecting section A and the operation display unit connecting section B. This allows the location of the operation display unit 304 to be moved in the front-back direction and up-down direction, whereby the operability and visibility of the operation display unit 304 can be improved. Particularly, the location of the operation display unit 304 in the front-back direction and up-down direction can be switched between a location assumed for an ordinary standing operation and a location assumed for a seated posture in a wheelchair or the like.

While the connecting and fixing of the support 305 to the apparatus body connecting sections C and D, and the connecting and fixing of the connecting member 307 to the operation display unit connecting sections A and B are performed by screw fixation or the like in the first embodiment, other methods may be adopted as long as the work can be easily performed by the user and a service personnel.

As described above, the copying machine 20 according to the first embodiment includes: the apparatus body 301; the operation display unit 304 provided on top of the apparatus body 301 and having the operation display surface 304*a* that allows an input operation by the user and provides a display for the user; and the supporting member 303 that supports the operation display unit 304 with one end thereof connected to the back of the operation display unit 304 and the other end thereof connected to the upper surface of the apparatus body 301 so that the operation display surface 304*a* faces in the same direction as the front surface of the apparatus body 301 does. The copying machine 20 according to the first embodiment further includes: the operation display unit connecting sections A and B for connecting with the one end of the supporting member 303, wherein the operation display unit connecting sections A and B are provided on the back of the operation display unit 304; and the apparatus body connecting sections C and D for connecting with the other end of the supporting member 303 provided on the upper surface of the apparatus body 301.

Accordingly, the connecting position of the supporting member 303 to the apparatus body 301 can be selected from the apparatus body connecting section C and the apparatus body connecting section D, and the connecting position of the supporting member 303 to the operation display unit 304 can be selected from the operation display unit connecting section A and the operation display unit connecting section B. This allows the location of the operation display unit 304 to be moved, whereby the operability and visibility of the operation display unit 304 may be improved.

Consequently, the copying machine 20 with the operation display unit 304 of superior operability and visibility may be provided.

Furthermore, addition of new members or replacement of any existing members and such are not required, resulting in no cost increase.

The copying machine 20 according to the first embodiment includes a plurality of apparatus body connecting sections C and D on the upper surface of the apparatus body 301 in the front-back direction, so that the operation display unit 304 can take both the forward and backward positions of the front surface of the apparatus body 301.

Accordingly, the connecting position of the supporting member 303 to the apparatus body 301 can be selected from the apparatus body connecting section C and the apparatus body connecting section D. This allows the operation display unit 304 to take both the forward and backward positions of the front surface of the apparatus body 301, whereby the operability and visibility of the operation display unit 304 may be improved.

The copying machine 20 according to the first embodiment includes a plurality of operation display unit connecting sections A and B on the back of the operation display unit 304 in the up-down direction.

Accordingly, the connecting position of the supporting member 303 to the operation display unit 304 can be selected from the operation display unit connecting section A and the operation display unit connecting section B. This allows the location of the operation display unit 304 to be moved in the up-down direction, whereby the operability and visibility of the operation display unit 304 may be improved.

The copying machine 20 according to the first embodiment includes a plurality of operation display unit connecting sections A and B on the back of the operation display unit 304 in the up-down direction, so that the lower end of the operation display unit 304 can be located below the upper surface of the apparatus body 301 when the operation display unit 304 is located forward of the front surface of the apparatus body 301.

Accordingly, the connecting position of the supporting member 303 to the operation display unit 304 can be selected from the operation display unit connecting section A and the operation display unit connecting section B. This allows the lower end of the operation display unit 304 to be located below the upper surface of the apparatus body 301, whereby the operability and visibility of the operation display unit 304 may be improved.

Second Embodiment

In a second embodiment, an elastic member is provided on a part of the operation display unit 304. Other structures are the same as those of the first embodiment. Therefore, like references refer to like constituents and their descriptions are omitted.

Figure 8:
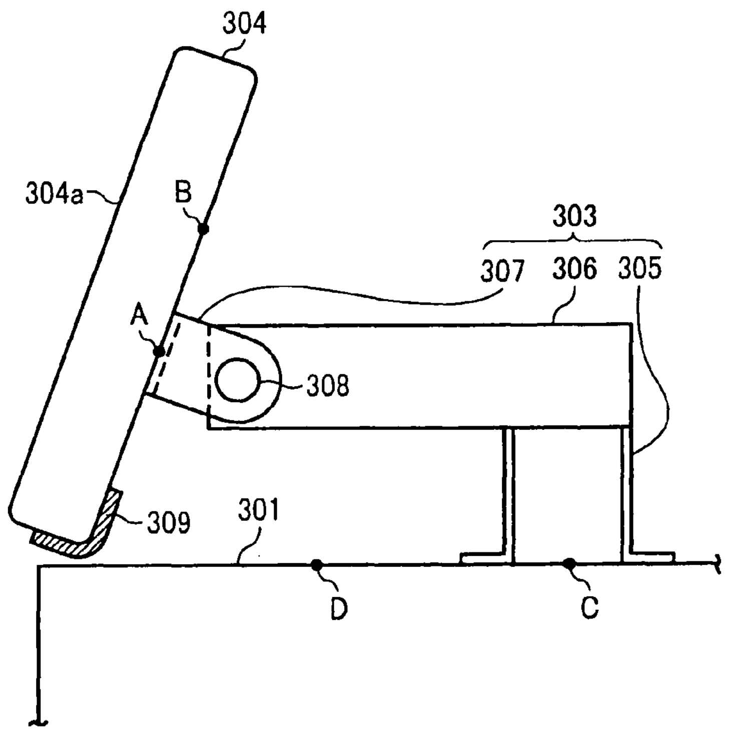
FIG. 8 is a side view of an example of the mounting position of an operation display unit of an image forming apparatus according to a second embodiment of the invention.
Figure 9:
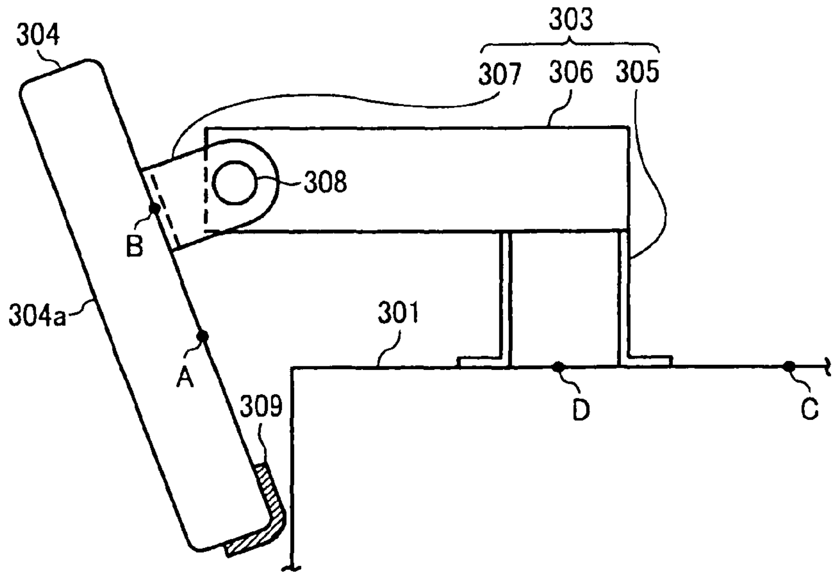
FIG. 9 is a side view of another example of the mounting position of the operation display unit of the image forming apparatus according to the second embodiment.

As illustrated in FIGS. 8 and 9, in the second embodiment, an elastic member 309 such as rubber is attached to the back side of the under surface and the lower end of the back of the operation display unit 304.

As illustrated in FIG. 8, when the support 305 is connected to the apparatus body connecting section C of the apparatus body 301, and the connecting member 307 is connected to the operation display unit connecting section A of the operation display unit 304, the operation display unit 304 is located in backward and upward. While the rotation of the operation display unit 304 about the horizontal axis, i.e., the counter-clockwise rotation in FIG. 8 is regulated by the upper surface of the apparatus body 301, the operation display unit 304 is prevented from being damaged by directly colliding against the upper surface of the apparatus body 301 because of the operation display unit 304 abutting on the upper surface of the apparatus body 301 with the elastic member 309 interposed therebetween.

As illustrated in FIG. 9, when the support 305 is connected to the apparatus body connecting section D of the apparatus body 301, and the connecting member 307 is connected to the operation display unit connecting section B of the operation display unit 304, the operation display unit 304 is located in forward and downward (low position). While the rotation of the operation display unit 304 about the horizontal axis is regulated by the front surface of the apparatus body 301, the operation display unit 304 is prevented from being damaged by directly colliding against the front surface of the apparatus body 301 because of the operation display unit 304 abutting on the front surface of the apparatus body 301 with the elastic member 309 interposed therebetween.

As described above, in the copying machine 20 according to the second embodiment, the supporting member 303 includes the rotation fulcrum point 308 that allows the operation display unit 304 to be rotated about the horizontal axis to change the elevation angle of the operation display unit 304, and the elastic member 309 is provided at the lower end of the reverse side of the operation display unit 304. This allows, when the operation display unit 304 is disposed forward of the front surface of the apparatus body 301, the rotating range of the operation display unit 304 to be regulated by the elastic member 309 abutting on the front surface of the apparatus body 301.

Accordingly, the rotating range of the operation display unit 304 may be regulated with a simple structure without a complex rotating range regulating mechanism.

When the operation display unit 304 is disposed forward of the front surface of the apparatus body 301, the operation display surface 304*a* of the operation display unit 304 faces downwards, whereby the operability and visibility for the user in seated posture is improved.

In the copying machine 20 according to the second embodiment, the supporting member 303 has the rotation fulcrum point 308 that allows the operation display unit 304 to be rotated about the horizontal axis to change the elevation angle of the operation display unit 304, and the elastic member 309 is provided at the lower end of the reverse side of the operation display unit 304. This allows, when the operation display unit 304 is disposed backward of the front surface of the apparatus body 301, the rotating range of the operation display unit 304 to be regulated by the elastic member 309 abutting on the upper surface of the apparatus body 301.

Accordingly, the rotating range of the operation display unit 304 can be regulated with a simple structure without a complex rotating range regulating mechanism.

When the operation display unit 304 is disposed backward of the front surface of the apparatus body 301, the operation display surface 304*a* of the operation display unit 304 faces upwards, whereby the operability and visibility for the user in standing posture is improved.

Third Embodiment

In a third embodiment, the connecting member 307 is covered with a cover. Other structures are the same as those of the first embodiment. To that extent, like references refer to like constituents and their descriptions are omitted.

Figure 10:
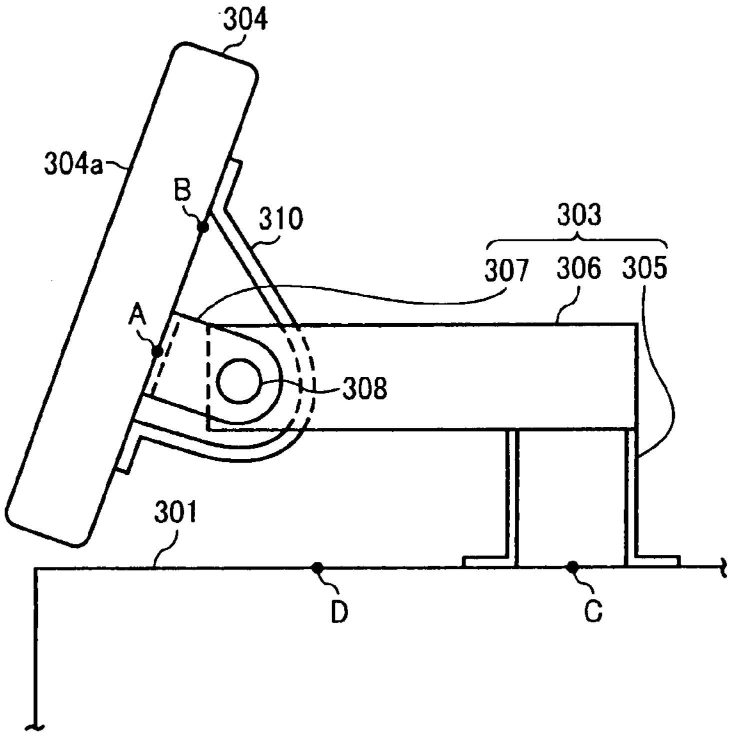
FIG. 10 is a side view of an example of the mounting position of an operation display unit of an image forming apparatus according to a third embodiment of the invention.
Figure 11:
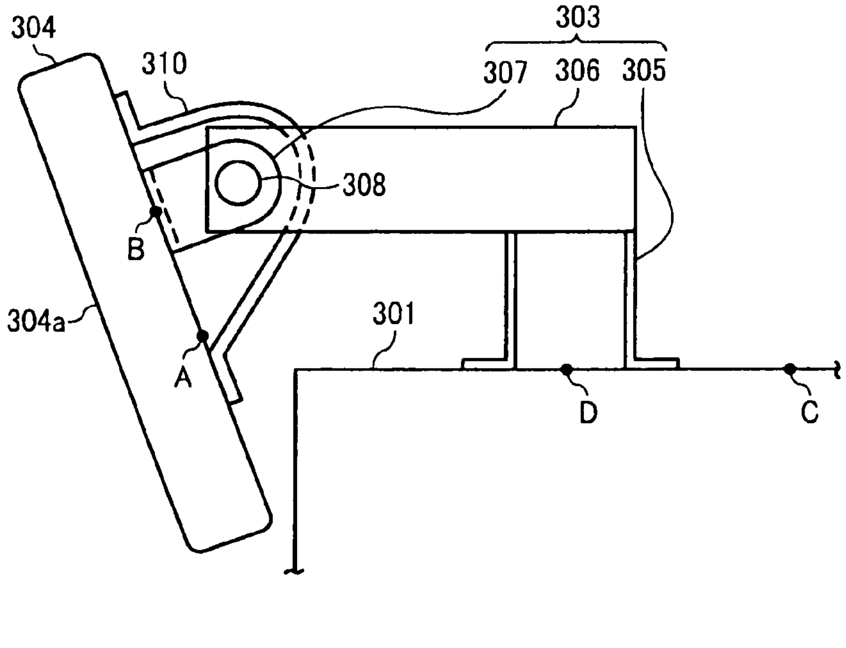
FIG. 11 is a side view of another example of the mounting position of the operation display unit of the image forming apparatus according to the third embodiment.

As illustrated in FIGS. 10 and 11, in the third embodiment, a covering member 310 covering the connecting member 307 is provided on the reverse side of the operation display unit 304. The covering member 310 is formed to be attachable to the reverse side of the operation display unit 304 even when the covering member 310 is inverted upside down.

In the third embodiment, similar to the second embodiment, the elastic member 309 such as rubber having elasticity may be attached to the back side of the under surface and the lower end of the back of the operation display unit 304.

As described above, the copying machine 20 according to the third embodiment includes the covering member 310 covering one end of the supporting member 303 on the reverse side of the operation display unit 304, and the covering member 310 is attachable upside down to the reverse side of the operation display unit 304.

Accordingly, the covering member 310 can be attached upside down to the reverse side of the operation display unit 304 without requiring any new members, thereby preventing an unnecessary cost increase.

As described in the foregoing, the image forming apparatus according to the invention has an advantageous effect of superior operability and visibility of the operation display unit and is useful as the image forming apparatus including the operation display unit that allows an input operation by the user and provides a display for the user.

According to the present invention, an image forming apparatus with an operation display unit of superior operability and visibility can be provided.

With this structure, the connecting position of the supporting member to the apparatus body may be selected from a number of apparatus body connecting sections. This allows the operation display unit to take both forward and backward locations of the front surface of the apparatus body, whereby the operability and visibility of the operation display unit may be improved.

With this structure, the connecting position of the supporting member to the operation display unit may be selected from a number of operation display unit connecting sections. This allows the location of the operation display unit to be moved in the up-down direction, whereby the operability and visibility of the operation display unit can be improved.

With this structure, the connecting position of the supporting member to the operation display unit can be selected from a number of operation display unit connecting sections. This allows the lower end of the operation display unit to be located below the upper surface of the apparatus body, whereby the operability and visibility of the operation display unit may be improved.

With this the structure, without providing a complex rotating range regulating mechanism, the rotating range of the operation display unit can be regulated with a simple structure.

When the operation display unit is disposed forward of the front surface of the apparatus body, the operation display surface of the operation display unit faces downwards, thereby improving the operability and visibility for the user in a seated posture.

With this structure, without providing a complex rotating range regulating mechanism, the rotating range of the operation display unit may be regulated with a simple structure.

When the operation display unit is disposed backward of the front surface of the apparatus body, the operation display surface of the operation display unit faces upwards, thereby improving the operability and visibility for the user in a standing posture.

With this structure, the covering member can be attached upside down to the back of the operation display unit without requiring any new members, thereby preventing an unnecessary cost increase.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus, comprising:

an apparatus body;

an operation display unit provided on top of the apparatus body and including an operation display surface that allows an input operation by a user and provides a display for the user;

a supporting member with a first end thereof connected to reverse side of the operation display unit and a second end thereof connected to an upper surface of the apparatus body, the supporting member supports the operation display unit such that the operation display surface faces in a same direction as a front surface of the apparatus body; and an elastic member provided on a lower end of the reverse side of the operation display unit, wherein:

the supporting member has a rotation fulcrum point allowing the operation display unit to be rotated about a horizontal axis to change an elevation angle of the operation display unit, when the operation display unit is disposed forward of the front surface of the apparatus body, a rotational range of the operation display unit is regulated by the elastic member, which is provided on the lower end of the operation display unit, abutting on the front surface of the apparatus body, and when the operation display unit is disposed backward of the front surface of the apparatus body, the rotational range of the operation display unit is regulated by the elastic member abutting on the upper surface of the apparatus body, a plurality of operation display unit connecting sections that connects to the first end of the supporting member are provided on the reverse side of the operation display unit and a plurality of apparatus body connecting sections that connects to the second end of the supporting member are provided on the upper surface of the apparatus body, wherein the plurality of apparatus body connecting sections are provided on the upper surface of the apparatus body in a front-back direction so that the operation display unit and the supporting member can take both forward and backward positions of a front surface of the apparatus body.

2. The image forming apparatus according to claim 1, wherein the operation display unit connecting sections are provided in plurality on a reverse side of the operation display unit in an up-down direction.

3. The image forming apparatus according to claim 2, wherein the operation display unit connecting sections are provided in plurality on the reverse side of the operation display unit in the up-down direction so that a lower end of the operation display unit is located below the upper surface of the apparatus body when the operation display unit is positioned forward of the front surface of the apparatus body.

4. The image forming apparatus according to claim 1, further comprising an elastic member provided on a lower end of the reverse side of the operation display unit, wherein the supporting member has a rotation fulcrum point allowing the operation display unit to be rotated about a horizontal axis to change an elevation angle of the operation display unit, and a rotation range of the operation display unit is regulated by the elastic member abutting on the upper surface of the apparatus body when the operation display unit is disposed backward of the front surface of the apparatus body.

* * * * *